April 23, 1963  R. A. FALLER  3,086,286
FRUIT KNIFE
Filed Sept. 12, 1961

INVENTOR.
RUDOLPH A. FALLER
BY
ATTORNEYS

United States Patent Office

3,086,286
Patented Apr. 23, 1963

3,086,286
FRUIT KNIFE
Rudolph A. Faller, 2038 Rambling Road,
Kalamazoo, Mich.
Filed Sept. 12, 1961, Ser. No. 137,598
7 Claims. (Cl. 30—24)

This invention relates to a cutting implement and more particularly to a fruit knife useful in the preparation of fruits, such as citrus fruits.

In the table preparation of such fruits as grapefruits or the like the fruit is normally first cut in half along a plane perpendicular to the core of the fruit. Spaced webs of the fruit extend radially from the core and are attached to the skin, the meat or flesh portions of the fruit being secured to the web portions and the skin.

In order to avoid the problems of squirting juice, awkwardness and possible embarrassment in eating such fruit it is customary to first cut the flesh portions from the skin and webs of the fruit.

Knives have been invented for this purpose. However conventional fruit knives are in many cases difficult to use as well as inefficient in the time required to prepare the fruit. This results because of improper design of the cutting edge of the knife, requiring in many cases much back and forth cutting motion to sever the flesh portions from the skin and webs. In addition in using known knives there is some waste of fruit because generally these knives cannot be used to cut the flesh portions uniformly and close to the webs and skin.

Accordingly it is an object of my invention to provide an improved fruit knife that overcomes the disadvantages of known implements of this type.

Another object of my invention is to provide a fruit knife having multiple cutting edges arranged so as to cut flesh portions of such fruit as grapefruit from the webs and skin thereof quickly and with less waste.

Yet another object of my invention is to provide a fruit knife having means formed on an end thereof for providing opposing laterally disposed forces on the web of a grapefruit or the like while simultaneously cutting the surfaces of adjacent flesh portions of the fruit from the opposite sides of a web.

Still another object of my invention is to provide a fruit knife wherein two angularly disposed cutting ends are formed on a cutting blade.

A further object of my invention is to provide a fruit knife having a split cutting end curved so as to conform with the inner surface of the skin of such fruit as grapefruit while at the same time being advantageous in cutting the flesh portions from the web of such fruit.

Another object of my invention is to provide a fruit knife having a split and curved cutting blade permitting the user to cut a flesh portion from a web and the skin of a grapefruit without removing the knife from the fruit during a cutting operation.

These and many other objects are attained by my invention which in general comprises a handle and blade extending therefrom. An end portion of the blade is split providing two angularly disposed cutting ends. The angularly disposed cutting ends are provided with cutting surfaces on both edges and thus the knife presents four cutting surfaces. The cutting ends of the blades are also preferably curved as well as angularly spaced so as to substantially conform with the inner surface of the skin of the fruit to be prepared.

The objects and advantages of a preferred embodiment of my invention will be clearly understood from the following description when taken in view of the drawing wherein.

Figure 1:
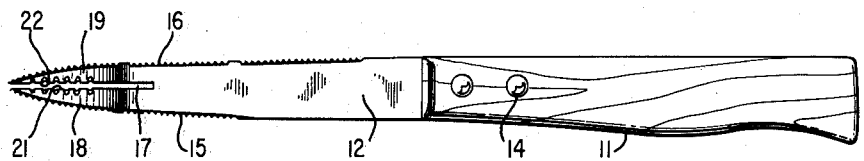
FIGURE 1 is a side elevational view of a fruit knife in accordance with the principles of my invention.
Figure 2:
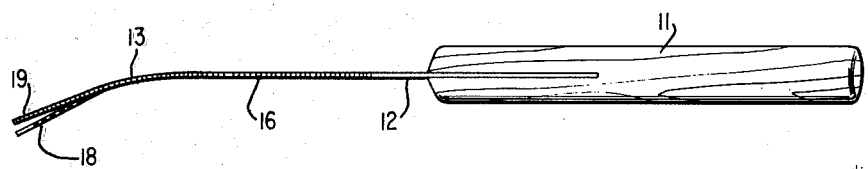
FIGURE 2 is a plane view of the fruit knife shown in FIGURE 1.

Referring to the drawing a preferred embodiment of my invention is shown in FIGURES 1 and 2 as comprising a handle 11 and a flat blade 12 having a curved end portion 13 secured to the handle 11 by suitable means such as rivets 14. Edges 15 and 16 of the blade are serrated or otherwise sharpened along a portion of their length.

A relatively narrow slit 17 which may be 1/16 of an inch wide is cut along a length of the blade 12 and splits or divides the curved end portion 13 into two cutting ends 18 and 19 integrally formed on the blade 12. The inner adjacent edges 21 and 22 of the cutting ends 18 and 19 respectively are provided with sharp cutting teeth or otherwise sharpened in known manner along a portion or the entire length of the slit 17. Thus each cutting end 18 and 19 has two cutting surfaces, providing a total of four cutting edges 15, 16 21 and 22 on the split ended blade 12.

Both cutting ends 18 and 19 are bent outwardly at different angles from the flat plane of the blade 12 starting at approximately the beginning of the slit 17 in the blade 12. The cutting end 18 is turned at a slightly greater angle to the blade 12 than the cutting end 19. In the preferred embodiment the cutting ends 18 and 19 are disposed at approximately 18 degrees and 14 degrees respectively from the blade 12. The above arrangement of cutting ends 18 and 19 is most suited to right handed use. By reversing the angles of cutting ends 18 and 19 to approximately 14 and 18 degrees respectively from the blade, the knife will be more suited to left handed use.

Figure 3:
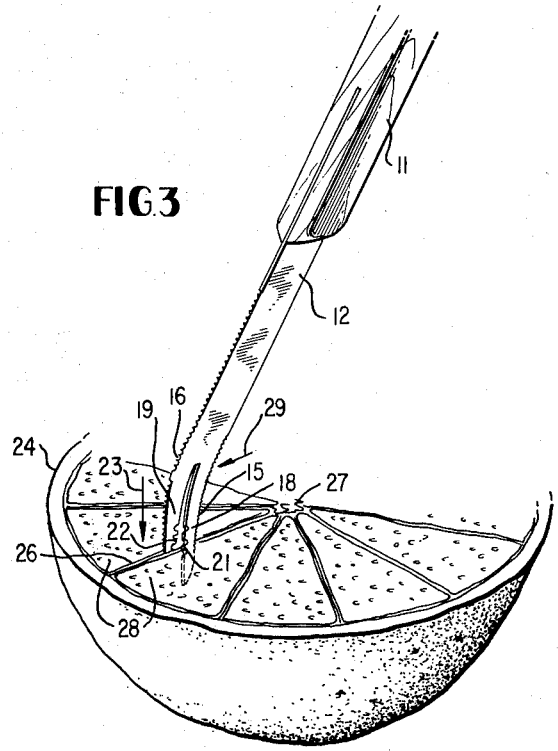
FIGURE 3 and 4 are perspective views illustrating the manner in which my invention is employed.

As shown in FIGURE 3 the blade 12 is inserted downwardly in the direction of the arrow 23 into a fruit half 24 to be prepared, the angularly disposed cutting ends 18 and 19 straddling a radial web 26 extending from a core 27 of the fruit half 24. The knife is preferably inserted into the fruit half 24 adjacent the core 27 and moved outwardly toward the skin although the knife may be inserted into the fruit half adjacent the skin and moved toward the core. The web 26 is received in the slit 17 and laterally supported on both sides by the cutting ends 18 and 19. The lateral and opposing forces exerted on the web 26 by the angularly disposed cutting ends 18 and 19 tend to support and maintain the web 26 in an upright position so that the cutting edges 16 and 21 follow the contour of the web 26, simultaneously cutting adjacent meat or flesh portions 28 of the fruit half 24 when the knife is moved in the direction of the arrow 29. The knife may also be moved along the web 26 in the opposite direction. In that event cutting edges 15 and 22 follow the contour of the web simultaneously cutting the adjacent flesh portions 28 from opposite sides of the web 26.

Because the cutting ends 18 and 19 simultaneously cut along two sides of the web 26, the time required to prepare the fruit half 24 is substantially reduced. Also there is less waste of fruit as the cutting ends 18 and 19 both support the web 26 and closely cut the adjacent flesh portions 28 from opposite sides of the intermediate web 26 simultaneously.

Figure 4:
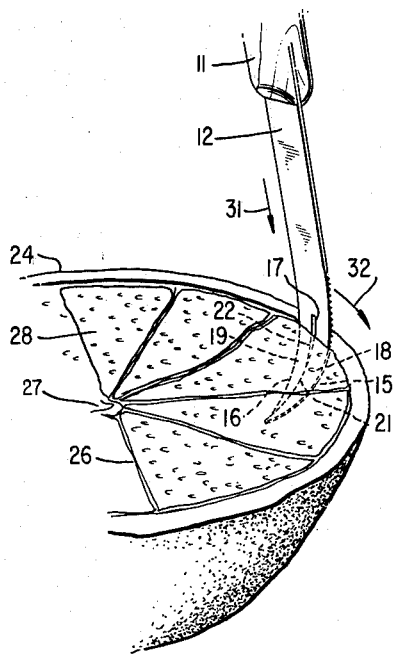

The split ended blade 12 providing four cutting edges 15, 21, 16 and 22 gives many advantages in cutting flesh portions from the skin of a fruit half 24 as shown in FIGURE 4. The curved blade 12 may be inserted downwardly in the direction of the arrow 31 into the fruit half 24. The blade 12 being curved conforms to the curvature of the fruit. The flesh portion 28 may also be cut from the fruit skin by continuing the cutting operation along the web 26. This is accomplished by turning the knife 90 degrees in either direction as the knife reaches the skin in traveling in the direction of the arrow 29. Thus a flesh portion may be cut from a web 26 and the fruit skin 28 without withdrawing the knife from the fruit, this greatly reduces the fruit preparation time.

When the knife is moved in the direction of the arrow 32, cutting end 18 provides a leading cutting edge 15 and the traveling or following cutting end 19 provides a secondary cutting edge 22. Cutting end 19 being disposed at less of an angle to the flat plane of the blade 12 engages the inner surface of the skin when an outward pressure is exerted on the knife, thus acts as a cutting edge guide as well as a secondary cutting means. Because the cutting ends 18 and 19 so closely follow the contour of the skin the flesh portions 28 are cut out of the fruit with substantially no waste.

When the knife is moved in a direction opposite to that shown by the arrow 32 again two cutting edges are provided. Cutting edge 16 on the leading end 19 is the leading cutting edge while the cutting edge 21 on the end 18 is the traveling cutting edge. The cutting end 19 engages the inner surface of the fruit skin and acts as a guide.

Thus the knife can be quickly inserted into the fruit adjacent to the skin and moved in either direction to cut the flesh portions 23 from the fruit skins closely and evenly.

Although I have described my invention in detail many changes and modifications may be made without departing from the scope of my invention which is to be limited only by the scope of the appended claims.

What I claim is:

1. A fruit knife comprising a handle and a flat blade extending from said handle, an end portion of said flat blade being split and formed so as to provide separated cutting ends angularly disposed with one another extending from the same side of the plane of said flat blade.

2. A fruit knife as defined in claim 1 wherein said cutting ends are formed so as to provide four cutting edges integrally formed on said blade, two of said four cutting edges lying in a first plane and the remaining two of said cutting edges lying in a second plane, said first and second planes being angularly disposed with one another.

3. Apparatus as defined in claim 1 wherein said cutting edges are serrated.

4. A fruit knife as defined in claim 1 wherein said cutting means extend at angles of approximately 14° and 18°, respectively, from the plane of said flat blade.

5. In a fruit knife for cutting the flesh portions of a fruit in which said flesh portions are secured to spaced web portions extending radially from a core of said fruit, said fruit being cut along a plane perpendicular to said core of said fruit, the improvement comprising a handle and a double edge flat blade secured thereto, an end portion of said flat blade being split to form two angularly disposed cutting ends extending at different angles and from the same side of the plane of said flat blade and having cutting edges on adjacent surfaces thereof, said angularly disposed cutting ends straddling one of said webs during a cutting operation whereby the surface of adjacent flesh portions are simultaneously served from both sides of said common web extending between said adjacent flesh portions.

6. In a fruit knife for detaching flesh portions of a fruit from an outer skin of said fruit, a handle; a flat double edged blade extending from said handle, the end of said flat blade being curved so as to conform to the configuration of said fruit; said curved end portion of said double edged blade being split to form two curved angularly disposed cutting ends extending at different angles from the same side of the plane of said flat blade, adjacent edges of said angularly disposed cutting ends having cutting edges formed thereon whereby said flesh portion is severed from said skin when said knife is inserted between said skin and said flesh portion and moved in either direction around the inner surface of said skin, one of said cutting ends engaging the inner surface of said skin and acting as a guide for the other of said two cutting ends.

7. A fruit knife for removing flesh portions of a fruit having webs extending radially from a central core of said fruit between and secured to said flesh portions comprising a handle and a flat blade having a curved end attached to said handle, said curved end of said flat blade being split forming two separate cutting ends angularly disposed with one another and extending from the same side of the plane of said flat blade, said angularly disposed cutting ends straddling said web and exerting laterally opposing forces thereon while simultaneously severing said adjacent flesh portions from opposite sides of said web when said knife is moved in a single cutting motion along said web.

References Cited in the file of this patent

UNITED STATES PATENTS

| | | |
|---|---|---|
| 468,592 | Blackwell | Feb. 9, 1892 |
| 1,479,015 | Steinman | Jan. 1, 1924 |
| 1,638,956 | Pinchbeck et al. | Aug. 16, 1927 |
| 2,528,166 | Orr et al. | Oct. 31, 1950 |
| 2,591,973 | Smith | Apr. 8, 1952 |

FOREIGN PATENTS

| | | |
|---|---|---|
| 652,764 | Great Britain | May 2, 1951 |